United States Patent
Yasuda (10) Patent No.: US 10,518,644 B2
(45) Date of Patent: Dec. 31, 2019

(54) CONTROL APPARATUS FOR DRIVING MOTOR

(71) Applicant: TOYOTA JIDOSHA KABUSHIKI KAISHA, Toyota-shi, Aichi-ken (JP)

(72) Inventor: Toshihiro Yasuda, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 108 days.

(21) Appl. No.: 15/851,961

(22) Filed: Dec. 22, 2017

(65) Prior Publication Data

US 2018/0178655 A1    Jun. 28, 2018

(30) Foreign Application Priority Data

Dec. 26, 2016    (JP) .................................. 2016-250454

(51) Int. Cl.
*B60W 20/00*  (2016.01)
*B60L 3/00*   (2019.01)
*G05B 13/02*  (2006.01)
*B60L 50/61*  (2019.01)

(52) U.S. Cl.
CPC .......... *B60L 3/0061* (2013.01); *G05B 13/026* (2013.01); *B60L 3/0084* (2013.01); *B60L 3/0092* (2013.01); *B60L 50/61* (2019.02); *B60L 2240/80* (2013.01); *B60W 20/00* (2013.01); *Y10S 903/906* (2013.01)

(58) Field of Classification Search
CPC ...... B60L 50/16; B60L 3/0084; B60L 3/0061; B60L 50/61; B60L 3/0092; B60L 3/12; B60L 2240/80; G05B 13/026; B60W 20/00

USPC .......................................................... 701/22
See application file for complete search history.

(56) References Cited

U.S. PATENT DOCUMENTS

| | | | |
|---|---|---|---|
| 2011/0089875 A1* | 4/2011 | Patel .................... | B60L 3/0038 318/400.09 |
| 2012/0065823 A1* | 3/2012 | Taguchi ................ | B60L 3/0061 701/22 |
| 2017/0254325 A1* | 9/2017 | Tajima ................... | G06F 11/07 |

FOREIGN PATENT DOCUMENTS

| | | |
|---|---|---|
| JP | 2007-28694 | 2/2007 |
| JP | 2012-60842 | 3/2012 |

* cited by examiner

*Primary Examiner* — Thomas G Black
*Assistant Examiner* — Wae L Louie
(74) *Attorney, Agent, or Firm* — Finnegan, Henderson, Farabow, Garrett & Dunner, LLP (57) ABSTRACT

A control apparatus comprises a time predictor configured to count a clock signal as a second count value when a timer unit has an abnormality, to stop counting the clock signal when any sub-process is performed by a sub-processor, and to predict time using the second count value; and a processing time storage unit configured to correlate each sub-process to a specified processing time of the sub-process and to store the correlation as a processing time list. When the timer unit has an abnormality, a main controller periodically performs a main process by using the time predicted by the time predictor. The time predictor predicts the time using a time corresponding to the second count value and a specified processing time of a sub-process performed by the sub-processor in the processing time list.

5 Claims, 5 Drawing Sheets

Fig. 5 ical field

CONTROL APPARATUS FOR DRIVING MOTOR

This application claims priority to Japanese Patent Application No. 2016-250454 filed 26 Dec. 2016, the contents of which is incorporated herein by reference.

TECHNICAL FIELD

The present disclosure relates to a control apparatus for a driving motor.

BACKGROUND

In a proposed control apparatus for a driving motor, a control microcomputer for controlling the driving motor is configured to send a watchdog signal that is a periodical pulse signal to a monitoring microcomputer (as described in, for example, JP 2012-60842A). When no watchdog signal has been input from the control microcomputer for a predetermined time period, the monitoring microcomputer determines that the control microcomputer has an abnormality and outputs a reset signal to the control microcomputer. The power supply is then cut out for a certain time period to stop (reset9 the control microcomputer.

SUMMARY

When an abnormality occurs in a timer unit of the control microcomputer that counts a clock signal to measure the time and generates the watchdog signal, the control microcomputer is stopped due to a failure in output of the watchdog signal. Even when the timer unit has an abnormality and fails to output the watchdog signal, as long as the time is predictable with a certain level of accuracy, the driving motor is periodically controllable using the predicted time. There is accordingly a need for predicting the time with a certain level of accuracy and thereby enabling a vehicle to be driven with controlling the driving motor (emergency driving).

A control apparatus for a driving motor of the present disclosure mainly aims to enable a vehicle to be driven with controlling the driving motor (emergency driving) even when a timer unit has an abnormality.

In order to achieve the above main object, the control apparatus for the driving motor of the present disclosure may be implemented by the following aspects.

According to one aspect of the present disclosure, there is provided a control apparatus for a driving motor including: a clock unit configured to generate a clock signal; a timer unit configured to count the clock signal as a first count value and measure time using the first count value; a main controller configured to periodically perform a main process using the time measured by the timer unit and to control the driving motor; a sub-processor configured to perform each sub-process; a time predictor configured to count the clock signal as a second count value when the timer unit has an abnormality, to stop counting the clock signal when any sub-process is performed by the sub-processor, and to predict time using the second count value; and a processing time storage unit configured to correlate each sub-process to a specified processing time of the sub-process and to store the correlation as a processing time list, wherein when the timer unit has an abnormality, the main controller periodically performs the main process by using the time predicted by the time predictor, and the time predictor predicts the time using a time corresponding to the second count value and a specified processing time of a sub-process performed by the sub-processor in the processing time list.

The control apparatus for the driving motor according to this aspect of the disclosure comprises the time predictor configured to count the clock signal as the second count value when the timer unit has an abnormality, to stop counting the clock signal when any sub-process is performed by the sub-processor, and to predict the time using the second count value; and the processing time storage unit configured to correlate each sub-process to a specified processing time of the sub-process and to store the correlation as the processing time list. When the timer unit has an abnormality, a main controller periodically performs a main process by using the time predicted by the time predictor. The time predictor predicts the time using a time corresponding to the second count value and a specified processing time of a sub-process performed by the sub-processor in the processing time list. This configuration reduces the difference between the predicted time and the actual time (i.e., predicts the time with a certain level of accuracy), compared with a configuration that predicts the time without taking into account the specified processing time of the performed interrupt process. As a result, even when the timer unit has an abnormality, this configuration enables the main controller to perform the main process by using the predicted time and thereby enables a vehicle to be driven with controlling the driving motor (emergency driving). The specified processing time is used as the execution time of the interrupt process. This configuration is likely to cause a slight difference between the predicted time and the actual time, unlike a configuration that causes the timer unit to measure the time including the actual execution time of the interrupt process.

DESCRIPTION OF EMBODIMENTS

The following describes some aspects of the present disclosure with reference to embodiments.

Figure 1:
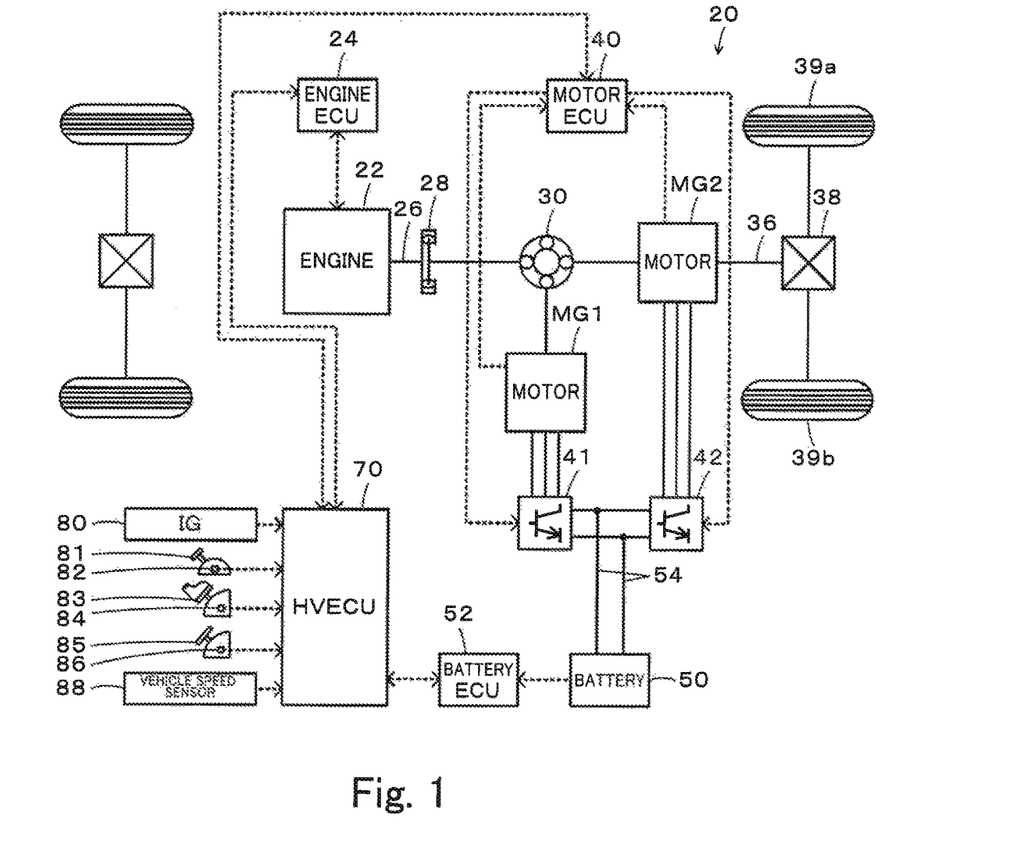
FIG. 1 is a configuration diagram illustrating the schematic configuration of a hybrid vehicle equipped with a control apparatus for a driving motor according to one embodiment of the present disclosure.
Figure 2:
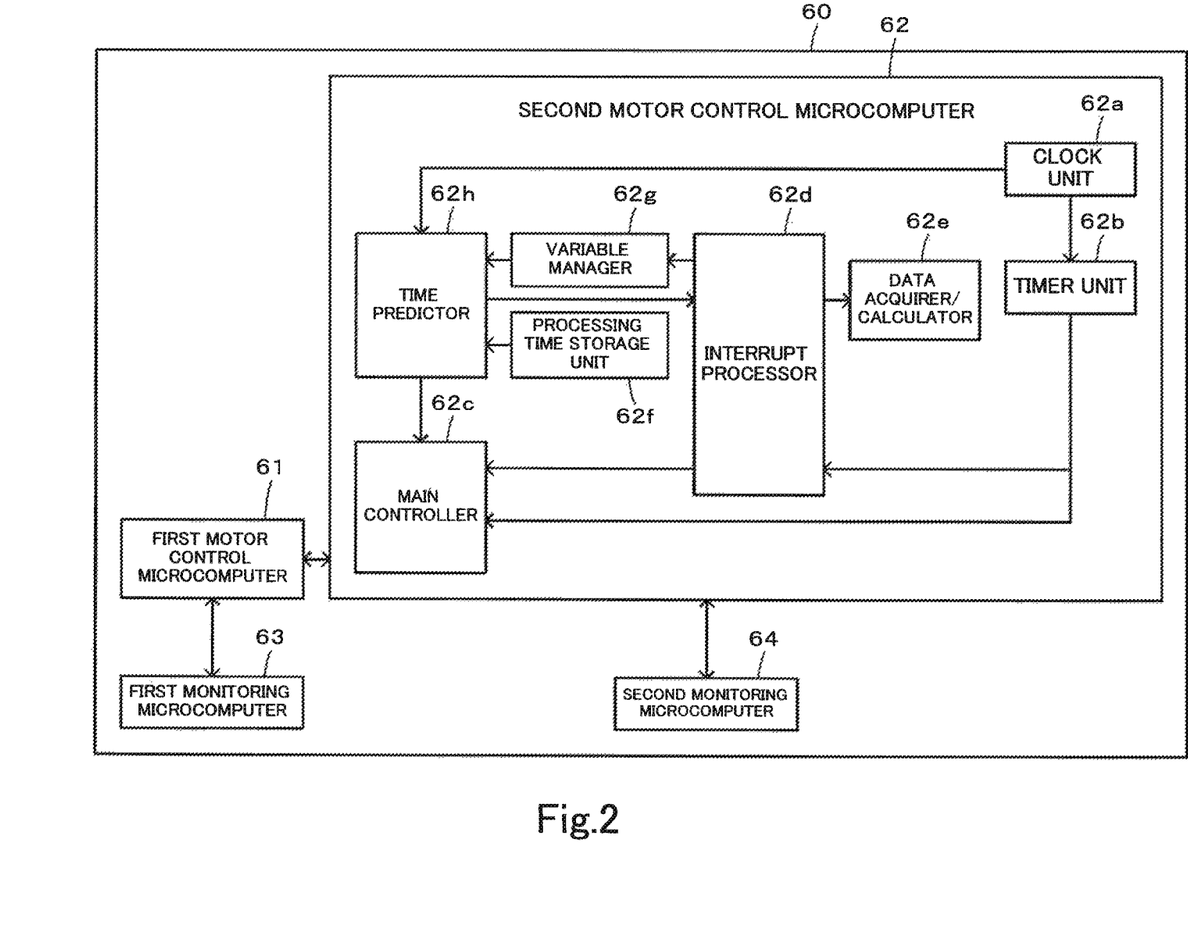
FIG. 2 is a functional block diagram showing functional blocks of a motor ECU.

FIG. 1 is a configuration diagram illustrating the schematic configuration of a hybrid vehicle 20 equipped with a control apparatus for a driving motor according to one embodiment of the present disclosure. FIG. 2 is a functional block diagram showing functional blocks of a motor ECU 60. As shown in FIG. 1, the hybrid vehicle 20 of the embodiment includes an engine 22, a planetary gear 30, motors MG1 and MG2, inverters 41 and 42, a battery 50 and a hybrid electronic control unit (hereinafter referred to as "HVECU") 70.

The engine 22 is configured as an internal combustion engine to output power using, for example, gasoline or light oil as a fuel. This engine 22 is subjected to operation control by an engine electronic control unit (hereinafter referred to as engine ECU) 24.

The engine ECU 24 is configured as a CPU-based microprocessor and includes a ROM configured to store processing programs, a RAM configured to temporarily store data, input/output ports and a communication port, in addition to the CPU, although not being illustrated. Signals from various sensors required for operation control of the engine 22, for example, a crank angle θcr from a crank position sensor (not shown) configured to detect the rotational position of a crankshaft 26 of the engine 22, are input into the engine ECU 24 via the input port. Various control signals for operation control of the engine 22 are output from the engine ECU 24 via the output port. The engine ECU 24 is configured to be communicable with the HVECU 70. The engine ECU 24 calculates a rotation speed Ne of the engine 22, based on the crank angle θcr input from the crank position sensor 23.

The planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 which is coupled with drive wheels 39a and 39b via a differential gear 38. The planetary gear 30 further includes a carrier that is connected with the crankshaft 26 of the engine 22 via a damper 28.

The motor MG1 may be configured, for example, as a synchronous generator motor and includes the rotor that is connected with the sun gear of the planetary gear 30 as described above. The motor MG2 may be configured, for example, as a synchronous generator motor and includes a rotor that is connected with the driveshaft 36. The inverters 41 and 42 are used to drive the motors MG1 and MG2 and are connected with the battery 50 via power lines 54. A motor electronic control unit (hereinafter referred to as "motor ECU") 60 configured as the control apparatus for the driving motor performs switching control of a plurality of switching elements (not shown) included in the respective inverters 41 and 42, so as to rotate and drive the motors MG1 and MG2.

As shown in FIG. 2, the motor ECU 60 includes first and second microcomputers for motor control (hereinafter referred to as "first and second motor control microcomputers") 61 and 62 and first and second microcomputers for monitoring (hereinafter referred to as "first and second monitoring microcomputers") 63 and 64. The first and second motor control microcomputers 61 and 62 are microcomputers for controlling the motors MG1 and MG2, and the first and second monitoring microcomputers 63 and 64 are microcomputers for monitoring the first and second motor control microcomputers 61 and 62. Each of the first and second motor control microcomputers 61 and 62 and the first and second monitoring microcomputers 63 and 64 is configured as a CPU-based microprocessor and includes a ROM configured to store processing programs, a RAM configured to temporarily store data, input/output ports and a communication port, in addition to the CPU, although not being illustrated. The first motor control microcomputer 61 is connected with the second motor control microcomputer 62, the first monitoring microcomputer 63 and the HVECU 70 via the respective communication ports. The second motor control microcomputer 62 is connected with the first motor control microcomputer 61, the second monitoring microcomputer 64 and the HVECU 70 via the respective communication ports. The following describes the second motor control microcomputer 62 and the second monitoring microcomputer 64. The first motor control microcomputer 61 and the first monitoring microcomputer 63 respectively have similar configurations to those of the second motor control microcomputer 62 and the second monitoring microcomputer 64.

The second motor control microcomputer 62 includes a clock unit 62a, a timer unit 62b, a main controller 62c, an interrupt processor 62d as a sub processor, a data acquirer/calculator 62e, a processing time storage unit 62f, a variable manager 62g and a time predictor 62h as functional blocks. According to the embodiment, the clock unit 62a and the timer unit 62b are implemented by hardware configuration, while the other functional blocks are implemented by software configuration. Either the hardware configuration or the software configuration may, however, be appropriately selected for each of the functional blocks.

The clock unit 62a generates a clock signal as a pulse signal of a fixed period (for example, period of approximately several tens nsec). The timer unit 62b counts the clock signal from the clock unit 62a as a first count value C1 and measures the time (as a product of the period of the clock signal and the first count value C1) by using the first count value C1. The timer unit 62b also generates a watchdog timer signal as a pulse signal of a fixed period (for example, period of approximately several μsec) based on the first count value C1 and sends the generated watchdog timer signal to the second monitoring microcomputer 64. The timer unit 62b is capable of measuring the time, irrespective of whether an interrupt process is performed by the interrupt processor 62d.

The main controller 62c performs a main process periodically (for example, at intervals of approximately 2.5 msec) by using the time measured by the timer unit 62b (hereinafter called "measured time") or a time predicted by the time predictor 62h (hereinafter called "predicted time"), so as to perform switching control of the plurality of switching elements included in the inverter 42 and thereby drive and control the motor MG2. The main process will be described later in detail.

The interrupt processor 62d provided as a sub-processor simply performs respective interrupt processes as respective sub-processes when the main process is not performed by the main controller 62c, while performing respective interrupt processes with interrupting the main process when the main process is performed by the main controller 62c. The respective interrupt processes include interrupt processes that are performed at fixed intervals (at intervals of, for example, 0.5 msec, 2.5 msec or 5 msec) using the measured time or the predicted time and interrupt processes that are performed at irregular intervals. An example of the interrupt process performed at fixed intervals is a process of performing abnormality diagnosis of each sensor or the like by an abnormality diagnosis unit (not shown). An example of the interrupt process performed at irregular intervals is a process of obtaining data and performing calculation by the data acquirer/calculator 62e described later.

As interrupt processes by the interrupt processor 62d, the data acquirer/calculator 62e performs, for example, a process of obtaining a rotational position θm2 of the rotor of the motor MG2 from a rotational position detection sensor, a process of obtaining phase currents (analog values) Iu2 and Iv2 flowing through the respective phases of the motor MG2 from a current sensor, a process of transmitting data to and from the first motor control microcomputer 61 and the HVECU 70 by communication, a process of calculating an electrical angle θe2 and a rotation speed Nm2 of the motor MG2 based on the rotational position θm2, and a process of converting the phase currents (analog values) Iu2 and Iv2 from the current sensor into phase currents (digital values) Iu2 and Iv2.

The processing time storage unit 62f correlates each of the interrupt processes to a specified processing time for the interrupt process and stores the correlation as a processing time list. The specified processing time is determined by experiment or by analysis. The variable manager 62g correlates each of the interrupt processes to a variable regarding the interrupt process and stores the correlation as a variable list. When an interrupt process is performed by the interrupt processor 62d, the variable manager 62g updates the variable regarding the performed interrupt process in the variable list. The variable used may be, for example, an execution frequency of each interrupt process or a value obtained or calculated (for example, rotational position θm2 or phase currents (digital values) Iu2 and Iv2). There is a possibility that the variable of the latter example has identical values before and after the update, so that the former example is-preferably used as the variable.

When the timer unit 62b has an abnormality, the time predictor 62h counts the clock signal from the clock unit 62a as a second count value C2. When any interrupt process is performed by the interrupt processor 62d, the time predictor 62h stops counting the clock signal and predicts the time using the second count value C2 (to calculate a predicted time). The time predictor 62h also serves to prohibit execution of an interrupt process by the interrupt processor 62d and to remove the prohibition. According to the embodiment, when any interrupt process is performed by the interrupt processor 62d, the resource (processing capacity of the CPU and the capacity of the RAM) for counting the clock signal by the time predictor 62h is allocated to execution of the interrupt process by the interrupt processor 62d. This causes the time predictor 62h to stop counting the clock signal. In other words, the configuration that causes the time predictor 62h to stop counting the clock signal when any interrupt process is performed by the interrupt processor 62d reduces the requirement for the increased processing capacity of the CPU and the increased capacity of RAM (i.e., reduces an increase in cost). The time predictor 62h is, however, configured not to directly recognize the interruption of counting of the clock signal by execution of the interrupt process by the interrupt processor 62d.

The second motor control microcomputer 62 is configured to check the value of a timer unit abnormality flag Ft sent from the second monitoring microcomputer 64 and recognize whether the timer unit 62b is normal or not.

The second monitoring microcomputer 64 is configured to receive the watchdog timer signal from the timer unit 62h of the second motor control microcomputer 62 and determine whether the timer unit 62b is normal or abnormal. When the timer unit 62b is normal, the second monitoring microcomputer 64 sets a value 0 to the timer unit abnormality flag Ft. When the timer unit 62b is abnormal, on the other hand, the second monitoring microcomputer 64 sets a value 1 to the timer unit abnormality flag Ft. The second monitoring microcomputer 64 then sends the setting of the timer unit abnormality flag Ft to the second motor control microcomputer 62. The timer unit abnormality flag Ft is set to the value 1, for example, when the second monitoring microcomputer 64 has not received the watchdog timer signal from the second motor control microcomputer 62 for a predetermined time period.

The battery 50 is configured as, for example, a lithium ion rechargeable battery or a nickel metal hydride battery and is connected with the inverters 41 and 42 via the power lines 54 as described above. The battery 50 is under management of a battery electronic control unit (hereinafter referred to as battery ECU) 52.

The battery ECU 52 is configured as a CPU-based microprocessor and includes a ROM configured to store processing programs, a RAM configured to temporarily store data, input/output ports and a communication port, in addition to the CPU, although not being illustrated. Signals from various sensors required for management of the battery 50 are input into the battery ECU 52 via the input port. The signals input into the battery ECU 52 include, for example, a voltage Vb of the battery 50 from a voltage sensor placed between terminals of the battery 50, a current Ib of the battery 50 from a current sensor mounted to an output terminal of the battery 50, and a temperature Tb of the battery 50 from a temperature sensor mounted to the battery 50. The battery ECU 52 is connected with the HVECU 70 via the respective communication ports. The battery ECU 52 calculates a state of charge SOC, based on an integrated value of the current Ib of the battery 50 input from the current sensor. The state of charge SOC denotes a ratio of the capacity of electric power dischargeable from the battery 50 to the overall capacity of the battery 50.

The HVECU 70 is configured as a CPU-based microprocessor and includes a ROM configured to store processing programs, a RAM configured to temporarily store data, input/output ports and a communication port, in addition to the CPU, although not being illustrated. Signals from various sensors are input into the HVECU 70 via the input port. The signals input into the HVECU 70 include, for example, an ignition signal from an ignition switch 80 and a shift position SP from a shift position sensor 82 configured to detect an operating position of a shift lever 81. The input signals also include an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, and a vehicle speed V from a vehicle speed sensor 88. The HVECU 70 is connected with the engine ECU 24, the motor ECU 60 and the battery ECU 52 via the respective communication ports as described above.

The hybrid vehicle 20 of the embodiment having the above configuration sets a required driving force of the driveshaft 36 based on the accelerator position Acc and the vehicle speed V, and controls operations of the engine 22 and the motors MG1 and MG2 such that a required power corresponding to the required driving force is output to the driveshaft 36. Operation modes of the engine 22 and the motors MG1 and MG2 may be, for example, modes (1) to (3) given below:

(1) torque conversion drive mode: mode of operating and controlling the engine 22 such that a power corresponding to the required power is output from the engine 22, and driving and controlling the motors MG1 and MG2 such that the whole of the power output from the engine 22 is subjected to torque conversion by the planetary gear 30 and the motors MG1 and MG2 and that the required power is output to the driveshaft 36;

(2) charge-discharge drive mode: mode of operating and controlling the engine 22 such that a power corresponding to the sum of the required power and an electric power required for charging or discharging the battery 50 is output from the engine 22, and driving and controlling the motors MG1 and MG2 such that the whole or part of the power output from the engine 22 is subjected to torque conversion by the planetary gear 30 and the motors MG1 and MG2 accompanied with charge or discharge of the battery 50 and that the required power is output to the driveshaft 36; and (3) motor drive mode: mode of stopping operation of the engine 22, and driving and controlling the motor MG2 such that the required power is output to the driveshaft 36.

In the hybrid vehicle 20 of the embodiment, when the motor MG2 is driven and controlled by the second motor control microcomputer 62, the main controller 62c basically performs the main process periodically (for example, at intervals of approximately 2.5 msec) using the measured time that is measured by the timer unit 62b to perform switching control of the plurality of switching elements included in the inverter 42. The motor MG1 is driven and controlled by the first motor control microcomputer 61 in a similar manner to the drive control of the motor MG2 by the second motor control microcomputer 62.

The main process refers to the latest data of the motor MG2, such as a power command Pm2*, the electrical angle θe2, the rotation speed Nm2 and the phase currents (digital values) Iu2 and Iv2 of the motor MG2, obtained by the interrupt processes by the interrupt processor 62d and divides the power command Pm2* by the rotation speed Nm2 to calculate a torque command Tm2* of the motor MG2, generates a drive command of the inverter 42 such that the motor MG2 is driven with the torque command Tm2*, and outputs the generated drive command to the inverter 42. In the case of controlling the inverter 42 by pulse width modulation control (PWM control), for example, the drive command of the inverter 42 is generated by performing coordinate transformation (three phase to two phase transformation) of the phase currents Iu2 and Iv2 of the motor MG2 into electric currents Id2 and Iq2 of a d axis and a q axis; setting current commands Id2* and Iq2* of the d axis and the q axis, based on the torque command Tm2* of the motor MG2; setting voltage commands Vd2* and Vq2* of the d axis and the q axis, based on the current commands Id2* and Iq2* and the electric currents Id2 and Iq2 of the d axis and the q axis; performing coordinate transformation (three phase to two phase transformation) of the voltage commands Vd2* and Vq2* of the d axis and the q axis into voltage commands Vu2*, Vv2* and Vw2* of the respective phases; and generating a PWM signal by comparison between the voltage commands Vu2*, Vv2* and Vw2* with a carrier wave (triangular wave) voltage. The interrupt process by the interrupt processor 62d is described above.

Figure 3:
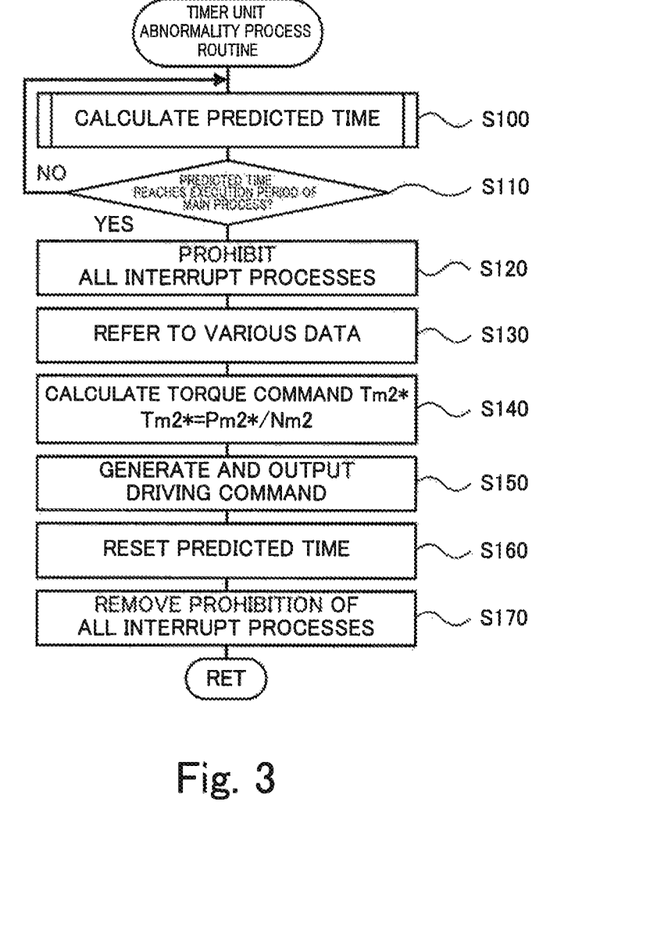
FIG. 3 is a flowchart showing one example of a timer unit abnormality process routine performed by a second motor control microcomputer.

The following describes the operations of the hybrid vehicle 20 of the embodiment having the above configuration or more specifically a series of processing by the second motor control microcomputer 62 when the timer unit 62b of the second motor control microcomputer 62 of the motor ECU 60 has an abnormality. FIG. 3 is a flowchart showing one example of a timer unit abnormality process routine performed by the second motor control microcomputer 62. This routine is performed repeatedly when the timer unit 62b has an abnormality. The second motor control microcomputer 62 checks the value of the timer unit abnormality flag Ft sent from the second monitoring microcomputer 64 to recognize whether the timer unit 62b is abnormal or not as described above.

Figure 4:
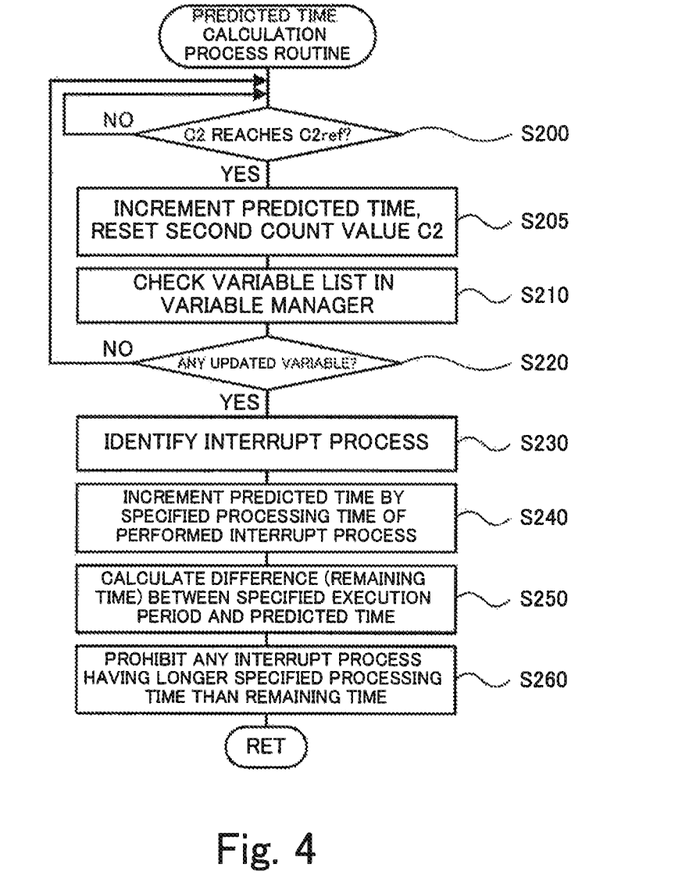
FIG. 4 is a flowchart showing one example of a predicted time calculation process routine performed by a time predictor of the second motor control microcomputer.

When the timer unit abnormality process routine of FIG. 3 is triggered, the timer predictor 62h calculates a predicted time by a predicted time calculation process of FIG. 4 (step S100) and determines whether the predicted time reaches a specified execution period of the main process by the main controller 62c (specified control period of the motor MG2) (step S110). When it is determined that the predicted time does not reach the specified execution time period of the main process by the main controller 62c, the time predictor 62h returns the processing flow to step S100. The time predictor 62h repeatedly performs the processing of steps S100 and S110 until the predicted time reaches the specified execution period of the main process by the main controller 62c. The specified execution period of the main process by the main controller 62c may be, for example, about 2.5 msec, as in the case where the timer unit 62b is normal.

When it is determined at step S110 that the predicted time reaches the specified execution period of the main process by the main controller 62c, the time predictor 62h prohibits execution of all interrupt processes by the interrupt processor 62d (step S120). The main controller 62c subsequently performs the main process (steps S130 to S150). More specifically, the main controller 62c refers to the latest data of the motor MG2, such as a power command Pm2* and the rotation speed Nm2 of the motor MG2, obtained by the interrupt processes by the interrupt processor 62d (step S130), divides the power command Pm2* by the rotation speed Nm2 to calculate a torque command Tm2* of the motor MG2 (step S140) and generates a drive command of the inverter 42 such that the motor MG2 is driven with the torque command Tm2* and outputs the generated drive command to the inverter 42 (step S150). According to the embodiment, when the timer unit 62b has an abnormality, the second motor control microcomputer 62 sends a signal indicating that the timer unit 62b has an abnormality to the HVECU 70. In response to the received signal, the HVECU 70 sets a power command Pm2* of the motor MG2 for emergency driving and sends the set power command Pm2* to the second motor control microcomputer 62.

The time predictor 62h subsequently resets the second count value C2 and the predicted time to value 0 (step S160), removes prohibition of execution of all the interrupt processes by the interrupt processor 62d (step S170) and then terminates this routine. The configuration of resetting the second count value C2 and the predicted time to the value 0 on termination of the main process avoids accumulation of an error of the predicted time from the actual time. The configuration of prohibiting execution of all the interrupt processes on start of the main process and removes the prohibition of execution of all the interrupt processes on termination of the main process suppresses a variation in actual execution time of the main process.

The following describes the processing of step S100 in the timer unit abnormality process routine of FIG. 3 with referring to a routine of the predicted time calculation process shown in FIG. 4. The predicted time calculation process routine of FIG. 4 is performed by the time predictor 62h of the second motor control microcomputer 62. When the predicted time calculation process routine of FIG. 4 is triggered, the time predictor 62h counts the clock signal from the clock unit 62a from value 0 as the second count value C2 and waits until the second count value C2 reaches a reference value C2ref (for example, a value corresponding to about several hundred μsec) (step S200). When the second count value C2 reaches the reference value C2ref, the time predictor 62h increments the predicted time by a time corresponding to the second count value C2 (time obtained as a product of the period of the clock signal and the second count value C2) and resets the second count value C2 to value 0 (step S205).

The time predictor 62h subsequently checks the variable list stored in the variable manager 62g (step S210) and determines whether at least one variable in the variable list stored in the variable manager 62g has been updated (step S220). This determines whether at least one interrupt process has been performed by the interrupt processor 62d. As described above, when an interrupt process is performed by the interrupt processor 62d, the time predictor 62h stops counting the clock signal from the clock unit 62a. The time predictor 62h is, however, not capable of directly recognizing the interruption. Accordingly, the time predictor 62h determines whether at least one variable in the variable list stored in the variable manager 62g has been updated, so as to determine whether at least one interrupt process has been performed by the interrupt processor 62d. Checking the variable list stored in the variable manager 62g also allows for determination of the occurrence of an abnormality in another part of the second motor control microcomputer 62 other than the timer unit 62b (more specifically, the interrupt processor 62d, the data acquirer/calculator 62e or the variable manager 62g). When the timer unit 62b has an abnormality and stops transmission of the watchdog timer signal, the second monitoring microcomputer 64 can recognize that the second motor control microcomputer 62 has an abnormality but cannot determine whether the abnormality occurs only in the timer unit 62b or also occurs in another part. When at least one variable in the variable list has been updated, it is considered that an interrupt process has been performed by the interrupt processor 62d to update the corresponding variable in the variable list. In this case, it is determinable that the interrupt processor 62d and the variable manger 62g are normal. When the interrupt process corresponding to the updated variable is involved in the data acquirer/calculator 62e, it is also determinable that the data acquirer/calculator 62e is normal.

When it is determined at step S220 that no variable in the variable list stored in the variable manger 62g has been updated, the time predictor 62h determines that no interrupt process has been performed by the interrupt processor 62d and returns the processing flow to step S200.

When it is determined at step S220 that at least one variable in the variable list stored in the variable manager 62g has been updated, on the other hand, the time predictor 62h identifies at least one interrupt process performed by the interrupt processor 62d, based on the updated at least one variable in the variable list (step S230).

The time predictor 62h subsequently uses the processing time list stored in the processing time storage unit 62f and increments the predicted time by a specified processing time of the at least one interrupt process performed by the interrupt processor 62d (step S240). As described above, the time predictor 62h stops counting the clock signal from the clock unit 62a, when any interrupt process is performed by the interrupt processor 62d. The configuration that performs the processing of step S240 reduces a difference between the predicted time and the actual time (i.e., calculates the predicted time with a certain level of accuracy), compared with the configuration that calculates the predicted time without taking into account the actual execution time of the interrupt process. As a result, even when the timer unit 62b has an abnormality, this configuration enables the main controller 62c to perform the main process by using the predicted time and thereby enables the hybrid vehicle 20 to be driven with driving and controlling the motor MG2 (emergency driving). The specified processing time is used as the execution time of the interrupt process. This configuration is likely to cause a slight difference between the predicted time and the actual time, unlike the configuration that causes the timer unit 62b to measure the time including the actual execution time of the interrupt process.

The time predictor 62h subsequently calculates a remaining time to the start of a next cycle of the main process (steps S130 to S150) as a difference between a specified execution period of the main process by the main controller 62c and the predicted time (step S250), refers to the processing time list stored in the processing time storage unit 62f and prohibits execution of any interrupt process having the longer specified processing time than the remaining time among the respective interrupt processes (step S260) and then terminates this routine. This configuration suppresses the predicted time from significantly exceeding the specified execution period of the main process by the main controller 62c (i.e., specified control period of the motor MG2) and suppresses the actual time from significantly exceeding the specified execution period of the main process. As a result, this suppresses a significant variation in the actual execution period of the main process and enables the hybrid vehicle 20 to be driven with more appropriately controlling the motor MG2. This configuration prohibits execution of any interrupt process having the specified processing time longer than the remaining time among the respective interrupt processes. This configuration accordingly enables the motor MG2 to be controlled with updating the power command Pm2* and the rotation speed Nm2 of the motor MG2 as much as possible, compared with a configuration that uniformly prohibits execution of all the interrupt processes.

Figure 5:
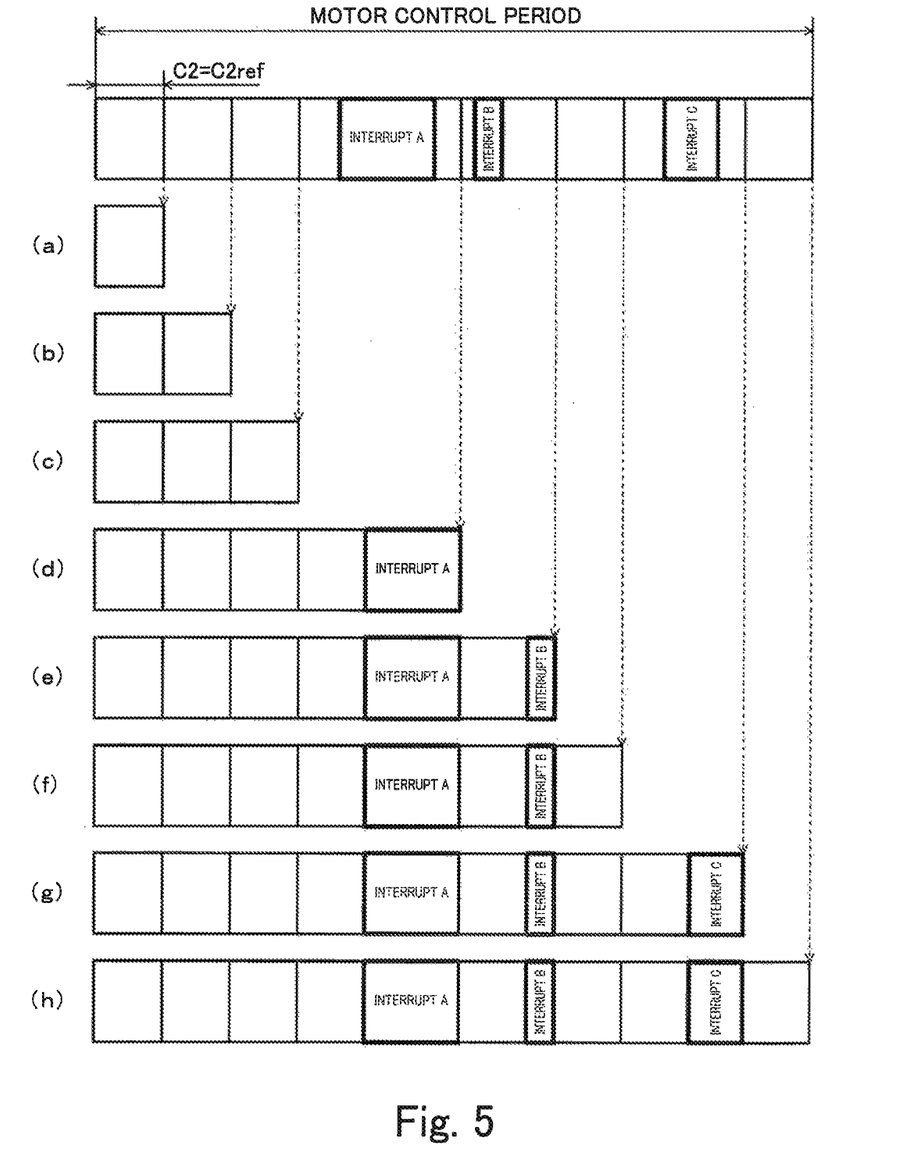
FIG. 5 is a diagram illustrating a method of calculating the predicted time.

FIG. 5 is a diagram illustrating a calculation method of the predicted time. The uppermost part of FIG. 5 shows one example of interrupt processes performed during the specified execution period of the main process performed by the main controller 62c (specified control period of the motor MG2). FIGS. 5(a) to 5(h) show a procedure of calculating the predicted time. In the case where no interrupt process is performed by the interrupt processor 62d until the second count value C2 reaches the reference value C2ref, when the second count value C2 reaches the reference value C2ref (step S200), the predicted time is incremented by the time corresponding to the second count value C2 (step S205) as shown in FIGS. 5(a) to (c), FIG. 5(f) and FIG. 5(h). In the case where any interrupt process is performed by the interrupt processor 62d until the second 165 count value C2 reaches the reference value C2ref, on the other hand, when the second count value C2 reaches the reference value C2ref (step S200), the predicted time is incremented by the time corresponding to the second count value C2 and the specified processing time of each performed interrupt process (interrupt processes A to C in FIG. 5) (steps S205 and S240) as shown in FIG. 5(d), FIG. 5(e) and FIG. 5(g). This configuration reduces the difference between the predicted time and the actual time (i.e., enhances the calculation accuracy of the predicted time), compared with a configuration that calculates the predicted time without taking into account the specified processing time of each performed interrupt process. After the calculation of the predicted time of FIG. 5(g), execution of any interrupt process having the longer specified processing time than the remaining time (for example, the interrupt process A in FIG. 5) is prohibited by using the remaining time and the processing time list stored in the processing time storage unit 62f. This configuration suppresses the predicted time from significantly exceeding the specified execution period of the main process (i.e., specified control period of the motor MG2) and suppresses the actual time from significantly exceeding the specified execution period of the main process.

In the second motor control microcomputer 62 of the motor ECU 60 mounted on the hybrid vehicle 20 of the embodiment described above, when the timer unit 62b has an abnormality, the time predictor 62h predicts the time (calculates the predicted time) using the time corresponding to the second count value C2 obtained by counting the clock signal from the clock unit 62*a* and the specified processing time of each performed interrupt process in the processing time list stored in the processing time storage unit 62*f*. The main controller 62*c* periodically performs the main process using the predicted time and drives and controls the motor MG2. This configuration reduces the difference between the predicted time and the actual time (i.e., calculates the predicted time with a certain level of accuracy), compared with the configuration that calculates the predicted time without taking into account the execution time of the performed interrupt process. As a result, even when the timer unit 62*b* has an abnormality, this configuration enables the main controller 62*c* to perform the main process by using the predicted time and thereby enables the hybrid vehicle 20 to be driven with driving and controlling the motor MG2 (emergency driving).

The second motor control microcomputer 62 of the embodiment uses the predicted time and the specified execution period of the main process by the main controller 62*c* (specified control period of the motor MG2) to calculate the remaining time to the start of a next cycle of the main process, and uses the processing list stored in the processing time storage unit 62*f* to prohibit execution of any interrupt process having the longer specified processing time than the remaining time among the respective interrupt processes. This configuration suppresses the predicted time from significantly exceeding the specified execution period of the main process by the main controller 62*c* and suppresses the actual time from significantly exceeding the specified execution period of the main process. As a result, this suppresses a significant variation in the actual execution period of the main process and enables the hybrid vehicle 20 to be driven with more appropriately controlling the motor MG2.

In the second motor control microcomputer 62 of the motor ECU 60 mounted on the hybrid vehicle 20 of the embodiment, the time predictor 62*h* prohibits execution of any interrupt process having the longer specified processing time in the processing time list stored in the processing time storage unit 62*f* than the remaining time to the start of a next cycle of the main process. According to a modification, however, the time predictor 62*h* may be configured not to prohibit execution of any interrupt process having the longer specified processing time in the processing time list than the remaining time.

In the second motor control microcomputer 62 of the motor ECU 60 mounted on the hybrid vehicle 20 of the embodiment, the time predictor 62*h* prohibits execution of all the interrupt processes by the interrupt processor 62*d* on start of the main process performed by the main controller 62*c* and removes the prohibition of execution of all the interrupt processes by the interrupt processor 62*d* on termination of the main process performed by the main controller 62*c*. According to a modification, however, the time predictor 62*h* may be configured not to prohibit execution of at least part of the interrupt processes by the interrupt processor 62*d* during the main process performed by the main controller 62*c*.

In the second motor control microcomputer 62 of the motor ECU 60 mounted on the hybrid vehicle 20 of the embodiment, the time predictor 62*h* resets the second count value C2 and the predicted time to the value 0 on termination of the main process performed by the main processor 62*c*. According to a modification, however, the time predictor 62*h* may be configured not to reset the second count value C2 and the predicted time to the value 0 on termination of the main process. In this modification, the processing of step S110 in the timer unit abnormality process routine of FIG. 3 may be replaced by determination of whether a variation in predicted time since termination of a previous cycle of the main process reaches the specified execution period of the main process (specified control period of the motor MG2).

The above embodiment describes the processing of the second motor control microcomputer 62 of the motor ECU 60 mounted on the hybrid vehicle 20 when the timer unit 62*b* of the second motor control microcomputer 62 has an abnormality. The first motor control microcomputer 61 performs a similar series of processing when the timer unit 61*b* of the first motor control microcomputer 61 has an abnormality.

The above embodiment describes application of the present disclosure to the second motor control microcomputer 62 of the motor ECU 60 mounted on the hybrid vehicle 20 that is equipped with the engine 22 and the motors MG1 and MG2. The present disclosure may also be applied to a motor control microcomputer of a motor ECU mounted on an electric vehicle that is equipped with a driving motor.

In the control apparatus for the driving motor according to the above aspect of the present disclosure, the time predictor may calculate a remaining time to start of a next cycle of the main process by using a specified execution period of the main process and the time predicted by the time predictor, and prohibit any sub-process having a longer specified processing time than the remaining time in the processing time list. This configuration suppresses the predicted time from significantly exceeding the specified execution period of the main process and suppresses the actual time from significantly exceeding the specified execution period of the main process. As a result, this suppresses a significant variation in the actual execution period of the main process and enables a vehicle to be driven with more appropriately controlling the driving motor.

In the control apparatus for the driving motor according to the above aspect of the present disclosure, the control apparatus may further include a variable manager configured to correlate each sub-process to a variable relating to the sub-process, to store the correlation as a variable list, and to update a variable relating to a sub-process performed by the sub-processor in the variable list. The time predictor may determine whether at least one variable in the variable list has been updated, so as to determine whether at least one sub-process has been performed by the sub-processor, and identify the at least one sub-process performed by the sub-processor, based on the at least one variable updated in the variable list. This configuration determines whether at least one sub-process has been performed by using the variable list and identifies the at least one performed sub-process.

In the control apparatus for the driving motor according to the above aspect of the present disclosure, the time predictor may prohibit execution of all sub-processes by the sub-processor on start of the main process performed by the main controller and remove the prohibition of execution of all the sub-processes by the sub-processor on termination of the main process performed by the main controller. This configuration suppresses a variation in actual execution time of the main process.

Additionally, in the control apparatus for the driving motor according to the above aspect of the present disclosure, the time predictor may reset the second count value and the predicted time to value 0 on termination of the main process performed by the main controller. This configuration avoids accumulation of an error of the predicted time from the actual time.

The following describes the correspondence relationship between the primary elements of the above embodiment and the primary elements of the disclosure described in Summary. The clock unit 62a of the embodiment corresponds to the "clock unit", the timer unit 62b corresponds to the "timer unit", and the main controller 62c corresponds to the "main controller". The interrupt processor 62d corresponds to the "sub-processor", the time predictor 62h corresponds to the "time predictor", and the processing time storage unit 62f corresponds to the "processing time storage unit". The variable manger 62g corresponds to the "variable manager".

The correspondence relationship between the primary components of the embodiment and the primary components of the present disclosure, regarding which the problem is described in Summary, should not be considered to limit the components of the present disclosure, regarding which the problem is described in Summary, since the embodiment is only illustrative to specifically describes the aspects of the present disclosure, regarding which the problem is described in Summary. In other words, the present disclosure, regarding which the problem is described in Summary, should be interpreted on the basis of the description in Summary, and the embodiment is only a specific example of the present disclosure, regarding which the problem is described in Summary.

The aspect of the present disclosure is described above with reference to the embodiment. The present disclosure is, however, not limited to the above embodiment but various modifications and variations may be made to the embodiment without departing from the scope of the present disclosure.

INDUSTRIAL APPLICABILITY

The present disclosure is applicable to, for example, the manufacturing industry of the control apparatus for the driving motor.

The invention claimed is:

1. A control apparatus for a driving motor, comprising:
a clock unit configured to generate a clock signal;
a timer unit configured to count the clock signal as a first count value and measure time using the first count value;
a main controller configured to periodically perform a main process using the time measured by the timer unit and to control the driving motor;
a sub-processor configured to perform each sub-process;
a time predictor configured to count the clock signal as a second count value when the control apparatus detect a first event relating to the timer unit, to stop counting the clock signal when any sub-process is performed by the sub-processor, and to predict time using the second count value; and
a processing time storage unit configured to correlate each sub-process to a specified processing time of the sub-process and to store the correlation as a processing time list, wherein
when the control apparatus detects the first event, the main controller periodically performs the main process by using the time predicted by the time predictor, and
the time predictor predicts the time using a time corresponding to the second count value and a specified processing time of a sub-process performed by the sub-processor in the processing time list.

2. The control apparatus for the driving motor according to claim 1,
wherein the time predictor calculates a remaining time to start of a next cycle of the main process by using a specified execution period of the main process and the time predicted by the time predictor, and prohibits any sub-process having a longer specified processing time than the remaining time in the processing time list.

3. The control apparatus for the driving motor according to claim 1, further comprising:
a variable manager configured to correlate each sub-process to a variable relating to the sub-process, to store the correlation as a variable list, and to update a variable relating to a sub-process performed by the sub-processor in the variable list, wherein
the time predictor determines whether at least one variable in the variable list has been updated, so as to determine whether at least one sub-process has been performed by the sub-processor, and identifies the at least one sub-process performed by the sub-processor, based on the at least one variable updated in the variable list.

4. The control apparatus for the driving motor according to claim 1,
wherein the time predictor prohibits execution of all sub-processes by the sub-processor on start of the main process performed by the main controller and removes the prohibition of execution of all the sub-processes by the sub-processor on termination of the main process performed by the main controller.

5. The control apparatus for the driving motor according to claim 1,
wherein the time predictor resets the second count value and the predicted time to value 0 on termination of the main process performed by the main controller.

* * * * *